US011698301B2

(12) United States Patent
Ram et al.

(10) Patent No.: US 11,698,301 B2
(45) Date of Patent: Jul. 11, 2023

(54) MULTIPLEXED SENSOR NETWORK USING SWEPT SOURCE RAMAN SPECTROSCOPY

(71) Applicant: Massachusetts Institute of Technology, Cambridge, MA (US)

(72) Inventors: Rajeev J. Ram, Arlington, MA (US); Amir H. Atabaki, San Francisco, CA (US); Nili Persits, Cambridge, MA (US); Jaehwan Kim, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 17/335,299

(22) Filed: Jun. 1, 2021

(65) Prior Publication Data

US 2022/0034715 A1 Feb. 3, 2022

Related U.S. Application Data

(60) Provisional application No. 63/059,219, filed on Jul. 31, 2020.

(51) Int. Cl.
*G01J 3/02* (2006.01)
*G01N 21/65* (2006.01)
(Continued)

(52) U.S. Cl.
CPC .......... *G01J 3/0218* (2013.01); *G01J 3/4412* (2013.01); *G01N 21/65* (2013.01); *G01N 2201/06113* (2013.01); *G02B 6/4206* (2013.01)

(58) Field of Classification Search
CPC .......... G01J 3/0218; G01J 3/44; G01N 21/65; G01N 2201/06113; G01N 2021/655;
(Continued)

(56) References Cited

U.S. PATENT DOCUMENTS 3,734,963 A 5/1973 Langer et al.
5,112,127 A 5/1992 Carrabba et al.
(Continued)

FOREIGN PATENT DOCUMENTS

| WO | WO-2018093363 A1 * | 5/2018 | ............. E21B 47/07 |
| WO | WO-2018178964 A1 * | 10/2018 | ............. G01J 3/0218 |
| WO | WO-2020055718 A1 * | 3/2020 | ......... A61B 1/00016 |

OTHER PUBLICATIONS

Perez-Herrera, R. A. et al. "Fiber optic sensor networks." Optical Fiber Technology 19.6 (2013): 689-699 (Year: 2013).*
(Continued)

*Primary Examiner* — Tarifur R Chowdhury
*Assistant Examiner* — Roberto Fabian, Jr.
(74) *Attorney, Agent, or Firm* — Smith Baluch LLP

(57) ABSTRACT

Swept-source Raman spectroscopy uses a tunable laser and a fixed-wavelength detector instead of a spectrometer or interferometer to perform Raman spectroscopy with the throughput advantage of Fourier transform Raman spectroscopy without bulky optics or moving mirrors. Although the tunable laser can be larger and more costly than a fixed wavelength diode laser used in other Raman systems, it is possible to split and switch the laser light to multiple ports simultaneously and/or sequentially. Each site can be monitored by its own fixed-wavelength detector. This architecture can be scaled by cascading fiber switches and/or couplers between the tunable laser and measurement sites. By multiplexing measurements at different sites, it is possible to monitor many sites at once. Moreover, each site can be meters to kilometers from the tunable laser. This makes it possible to perform swept-source Raman spectroscopy at many points across a continuous flow manufacturing environment with a single laser.

20 Claims, 16 Drawing Sheets

(51) Int. Cl.
*G01J 3/44* (2006.01)
*G02B 6/42* (2006.01)

(58) Field of Classification Search
CPC ....... G01N 2021/651; G01N 2201/088; G02B 6/4206; G02B 6/2817; G02B 6/32; H01S 5/4087; H01S 5/4012; H01S 5/0085; H01S 5/0057
See application file for complete search history.

(56) References Cited

U.S. PATENT DOCUMENTS

| | | | |
|---|---|---|---|
| 5,455,673 A | 10/1995 | Alsmeyer et al. | |
| 6,008,894 A | 12/1999 | Schmucker et al. | |
| 7,773,217 B2 | 8/2010 | Sriram et al. | |
| 8,953,911 B1* | 2/2015 | Xu | G02B 6/4214 385/12 |
| 10,194,805 B2* | 2/2019 | Bechtel | A61B 5/0075 |
| 10,656,012 B2 | 5/2020 | Atabaki et al. | |
| 2003/0174387 A1 | 9/2003 | Eggleton et al. | |
| 2012/0194814 A1* | 8/2012 | Wang | G01J 3/44 250/200 |
| 2019/0195688 A1* | 6/2019 | Atabaki | G01J 3/44 |
| 2020/0003619 A1* | 1/2020 | Hu | G01J 3/4406 |
| 2020/0113439 A1* | 4/2020 | Mohseni | A61B 5/0042 |

OTHER PUBLICATIONS

Barton, J., et al. "Fiber bundles with integrated bandpass and notch filters for in-vivo Raman spectroscopy." Optical Fibers and Sensors for Medical Diagnostics and Treatment Applications XX. vol. 11233. SPIE, 2020 (Year: 2020).*

International Search Report and Written Opinion in International Patent Application No. PCT/US2021/035105 dated Sep. 10, 2021, 11 pages.

Cordero et al., "In-vivo Raman spectroscopy: from basics to applications" Journal of Biomedical Optics 23.7 (2018): 071210. 24 pages.

McCreery et al., "Fiber optic probe for remote Raman spectrometry." Analytical Chemistry 55.1 (1983): 146-148.

Walker et al., "Network of 12 Optical Sensors Using Code-Division Multiplexing," Electronics Letters, vol. 28, No. 22, pp. 2074-2074, Oct. 22, 1992. 2 pages.

* cited by examiner

MULTIPLEXED SENSOR NETWORK USING SWEPT SOURCE RAMAN SPECTROSCOPY

CROSS-REFERENCE TO RELATED APPLICATION(S)

This application claims the priority benefit, under 35 U.S.C. 119(e), of U.S. Application Ser. No. 63/059,219, which was filed on Jul. 31, 2020 and is incorporated herein by reference in its entirety for all purposes.

GOVERNMENT SUPPORT

This invention was made with government support under U01 FD006751 awarded by the Food and Drug Administration. The government has certain rights in the invention.

BACKGROUND

Raman spectroscopy is a technique used to gain information about the chemical composition of a material and the state of that material. In this technique, the sample is illuminated with a bright light source and the wavelength distribution of the scattered light is measured. 'Fingerprint' chemical spectra are acquired when a laser excites different molecular vibrations. These molecular vibrations extract some energy from the excitation light resulting in scattered light at a longer wavelength. The vibrations can also add energy to the excitation light, producing scattered light at a shorter wavelength. While information rich, this scattered light, which is the Raman signal, is very weak as only about one out of a billion laser photons excite molecular vibrations.

SUMMARY

A conventional Raman system uses a spectrometer to determine the distribution of the scattered light. Because these spectrometers typically disperse colors of light in different directions and rely on free space propagation for their spectral separation and detection, they exhibit tradeoffs between spectral resolution, sensitivity, and device size. Raman spectrometers that can provide the spectral resolution and sensitivity desired for monitoring continuous flow manufacturing processes tend to be bulky, power hungry, and expensive.

Conventionally, there are two primary modes for Raman spectroscopic analysis—dispersive Raman using a grating-based spectrometer or Fourier Transform Raman (FT-Raman) spectroscopy that uses a Michelson interferometer. A third approach to Raman spectroscopy is Swept Source Raman (SS-Raman) spectroscopy, which utilizes a tunable laser and a low-cost, fixed-wavelength detector instead of a spectrometer or interferometer. SS-Raman spectroscopy offers the throughput (light gathering) advantage of FT-Raman spectroscopy without the need for bulky optics or moving mirrors. SS-Raman spectroscopy is readily scaled to many measurement ports, making it more suitable for monitoring continuous flow manufacturing processes, in part because it uses small, inexpensive fixed-wavelength detector(s) instead of spectrometers.

Despite these advantages, SS-Raman systems have other drawbacks. The biggest drawback is usually the size and expense of the tunable laser in the SS-Raman system. Tunable lasers tend to be larger and more expensive than the fixed-wavelength diode lasers used in other modern Raman systems. Nevertheless, it is possible to split and switch the laser light from a tunable laser in a multiplexed SS-Raman system to multiple ports (commercial fiber switches support 1×16 switches at the wavelengths and power levels relevant for Raman spectroscopy). Appropriate tunable lasers have been developed for large markets, including clinical diagnostics (e.g., optical coherence tomography) and automotive sensing (e.g., LIDAR). Multiplexing the tunable laser output using fiber-optic components, including optical fibers, switches, and/or passive couplers, sidesteps the drawbacks of a conventional SS-Raman system by allowing a single, remotely located tunable laser to probe many measurement sites. The laser output, which can be treated as a continuous wave, can be transmitted a great distance though optical fiber with little or no dispersion. The propagation distance depends on the optical power of the laser output. Within an optical power range of 1 mW to 500 mW, the laser output light may be transmitted up to several kilometers.

A (multiplexed) SS-Raman system includes a tunable laser, a fiber optic network, an optical filter, and a spectrally selective detector. The tunable laser emits a tunable excitation beam. The fiber optic network transports the tunable excitation beam to remote measurement locations. The optical filter and spectrally selective detector collect and detect the Raman signal emitted from those sample sites. The SS-Raman system can be multiplexed so that several remote measurement locations can be sampled using the same tunable laser. The fiber optic network can include passive optical splitters and/or active optical switches to direct the excitation beam to multiple remote measurement locations. Each remote measurement location is associated with a Raman probe, a detector, and a spectrally selective filter. One or more narrow band pass filters may be used to select the wavelength range. The narrow band pass filter may be changeable.

A multiplexed Raman sensor system can be used for monitoring a continuous manufacturing line or other environment. In this context, the system can include a Raman pump source, a fiber-optic network, and a plurality of detectors. In operation, the Raman pump source emits a Raman pump beam (e.g., at a power level of 10 mW, 50 mW, 100 mW, 150 mW, 200 mW, 250 mW, 500 mW, or more), which the fiber-optic network guides from the Raman pump source to each of a plurality of probes. Each probe of these probes is configured to probe a sample at a corresponding measurement site along the continuous flow manufacturing line with the Raman pump beam. And each of the detectors is configured to detect a Raman signal in response to the Raman pump beam from a corresponding measurement site along the continuous flow manufacturing line.

The fiber-optic network can include a fiber-optic switch to switch the Raman pump beam between different measurement sites along the continuous flow manufacturing line. The fiber-optic network can also include a fiber-optic splitter to couple the Raman pump beam to different measurement sites along the continuous flow manufacturing line. Each of the detectors can include a filter to pass the Raman signal and to reject light at other wavelengths and a photodetector, in optical communication with the filter, to sense the Raman signal. The system can also include at least one collection fiber to guide the Raman signal from the corresponding measurement site to the corresponding detector in the plurality of detectors. And it can include at least one modulator, in optical communication with the Raman pump source and the fiber-optic network, to modulate the Raman pump with different waveforms, each of which corresponds to a different one of the corresponding measurement sites.

All combinations of the foregoing concepts and additional concepts discussed in greater detail below (provided such concepts are not mutually inconsistent) are part of the inventive subject matter disclosed herein. All combinations of claimed subject matter appearing at the end of this disclosure are part of the inventive subject matter disclosed herein. The terminology used herein that also may appear in any disclosure incorporated by reference should be accorded a meaning most consistent with the concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., elements that are functionally and/or structurally similar).

DETAILED DESCRIPTION

Figure 1A:
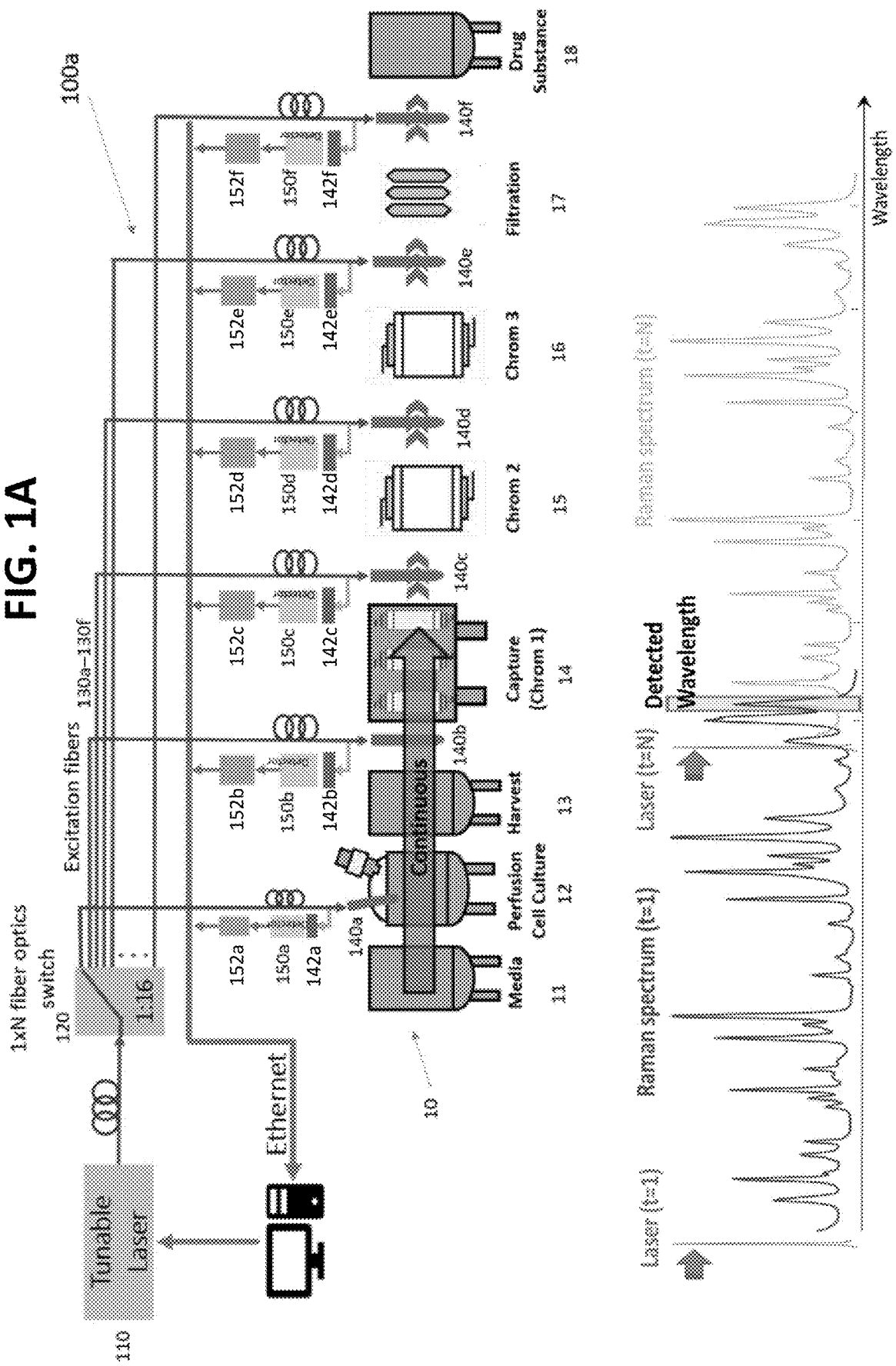
FIG. 1A shows a swept-source Raman sensor network for multi-point monitoring of a continuous manufacturing process and output spectra acquired by the Raman sensor network.

A single tunable laser coupled to one or more switches and/or splitters can generate light for many measurement sites in continuous manufacturing system, with optical fiber coupling the light from the switch(es) and/or splitter(s) to each measurement site. The fiber optics allow for Raman spectroscopy to be performed at one or more locations that may be distant (e.g., meters to kilometers) from either the excitation light source or the detector(s) (or both). The laser can illuminate measurement sites simultaneously via a fiber-optic coupler or sequentially using a fiber-coupled switch. Cascaded couplers and switches can be used to monitor different sites with different combinations of sequential and/or simultaneous measurements.

Using a single tunable laser to illuminate many measurement sites is a desirable approach when the cost of providing individual tunable lasers at each measurement site outweighs the total cost of a single tunable laser and the optical fibers to couple the single tunable laser to each measurement site. Higher laser power tends to improve the sensitivity, but the cost of a tunable laser increases with its power output. For example, the cost of a tunable laser with an optical power output of 1 mW to 10 mW may be low enough that it is cost-effective to provide an individual laser at each measurement site. However, many Raman systems use higher optical powers, e.g., in the range of 50 mW to 500 mW. At present, for excitation powers greater than 10 mW, it can be more cost effective to use a single tunable laser to illuminate many measurement sites than using one laser per measurement site.

Optical fiber can also be used to collect light from the measurement sites. As mentioned above, unlike in a conventional Raman system, an SS-Raman system does not use a spectrometer at every measurement site or a mechanism to collect light from multiple fiber bundles. Instead, each measurement site can be monitored by a low-cost, fixed-wavelength detector. Each site can be monitored by its own dedicated detector, which may be at the site or optically connected to the site via an optical fiber. Alternatively, multiple sites can be coupled to a single detector via optical fibers that connect to a switch or splitter. This architecture can be further scaled inexpensively by cascading the fiber switches between the tunable laser source and the measurement sites and/or between the measurement sites and the detector(s).

Fiber optic signals for Raman spectroscopy may be delivered to each measurement site via a corresponding fiber optic probe. Lenses and optical filters may be incorporated within the fiber optic probe for (1) removing spontaneous emission light from the excitation source or Raman photons generated during transmission of the excitation light, (2) filtering the excitation light along the collection fiber before transmission of the collected Raman photons, (3) focusing the excitation light on the source, and/or (4) coupling the Raman light into the collection fiber. One outstanding challenge for remote Raman spectroscopy has been the limited number of measurement points (or Raman probes) that can be interfaced to a single excitation source or a single spectrometer. Commercial Raman systems used for remote Raman sensing are limited to four measurement points, mainly because of the spectrometer sensitivity. This limitation arises from the challenge associated with efficient collection and delivery of the Raman laser light to a remote spectrometer, which may have a narrow entrance and/or small numerical aperture. Another reason for this limitation is the limited area of the detector array in the spectrometer; because the light from the probes is spectrally dispersed, then stacked vertically onto the detector array. Increasing the detector array area is challenging and hence not scalable.

Replacing the spectrometer with fixed-wavelength detectors, which can be very sensitive, circumvents the limitation of efficient collection and delivery of the Raman laser light to a remote spectrometer. Each fixed-wavelength detector can be implemented as a fixed optical filter coupled with a detector to collect and detect Raman light at a single wavelength or narrow wavelength band. The Raman spectrum can then be obtained sequentially by sweeping the frequency (wavelength) of the excitation source, and therefore, the frequency (wavelength) offset between the excitation signals.

A multiplexed SS-Raman instrument with fixed-wavelength detector(s) can support multiple measurement sites or Raman probes (e.g., 4, 5, 6, 7, 8, 9, 10, 11, 12, 13, 14, 15, 16, or more measurement sites). Because a multiplexed SS-Raman instrument is not constrained by the collection power of the spectrometer (namely, by the spectrometer's entrance slit and numerical aperture), it can use collection optical fibers with enhanced light gathering capabilities.

Several tunable lasers can be combined to increase the tuning range. The tunable lasers can be multiplexed, for example, by frequency division multiplexing, to be used in the same optical channels simultaneously. The tunable lasers may be modulated, e.g., to probe different spectral bands for target measurements. They can also be temporally multiplexed, e.g., with an optical switch. Optical switches may be cascaded to increase the number of optical channels. The optical channels may be formed by optical fibers or by free space optical components.

The SS-Raman system may use lock-in detection to improve the sensitivity of the detectors. Lock-in detection includes modulation of the intensity of the excitation light and synchronization of the modulated light and the modulated electrical signal from the detector. A mechanical chopper, an integrated optical modulator, or a MEMS switch can be used to modulate the intensity of the excitation light source. The modulator can be located near the laser, within the fiber-optic network, or near the detector. Detection and phase retrieval after light detection can be used to synchronize the modulated excitation light and the modulated electrical signal from the detector. Alternatively, distribution of a synchronization signal over either an optical or electrical network can be used to synchronize the excitation light and electrical signal. The sensed signal may be converted to digital format at the remote detector and may be made accessible through a wired or wireless optical or electronic network.

The detector and optical filter can be distributed spatially (for example, near the Raman probe) or centrally near the excitation light source. The detector and the optical filter to be in separate places, for example the filter may be integrated with the Raman probe while the detector is external to the probe.

This configuration supports new architectures for distribution of the excitation laser light. The light may be distributed over a fiber optic network that can use passive optical splitters or can be actively switched to each of the probe points. While the tunable laser can be larger and more costly than a fixed wavelength diode laser used in modern Raman systems, it is possible to split and switch the laser light to multiple ports. For example, 1×16 switches are commercially available at wavelengths and power levels relevant for Raman spectroscopy. This architecture can be further scaled inexpensively by cascading the fiber switches.

In another configuration, a spatial light modulator (SLM) may be used as the switch to couple light from the tunable laser to different measurement sites, with different SLM pixels or different groups of SLM pixels mapping to different measurement sites. Each SLM pixel or group of SLM pixels modulates the output of the Raman pump laser with a pseudo-random bit sequence (PRBS) that propagates transversely across the face SLM. This imparts temporally shifted versions of the same code onto the beams for the different measurement sites, meaning that the beams for the different measurement sites are code-division multiplexed (CDM) for high signal-to-noise ratios and low crosstalk.

The application scope for this approach to highly multiplexed Raman sensing can be extended to any setting where multipoint measurement can be made. These include manufacturing environments (discussed above), agriculture (open and closed environments), building air quality monitoring, monitoring municipal water supplies, raw material flows, waste material flows, and imaging (by merging the multipoint data into a hyperspectral Raman image), and environmental monitoring.

A highly multiplexed Raman sensing architecture can be deployed for applications where multipoint measurement should be made. These include manufacturing environments (such as at different unit process steps within a chemical or pharmaceutical manufacturing process), agriculture (different locations within a green house or hydroponic facility), medical testing (within clinics and hospitals), air quality monitoring, monitoring municipal water supplies, raw material flows, waste material flows, and imaging (by merging the multipoint data into a hyperspectral Raman image). The multiplexed instrument can make an entire process-flow observable and support global control.

Multiplexed Swept-Source Raman Systems for Monitoring Continuous Manufacturing

FIG. 1A shows a SS-Raman system 100a used for multipoint monitoring of a continuous manufacturing line 10. This SS-Raman system 100a includes a Raman pump source, which may include one or more lasers 110, and monitors six remote measurement locations within the continuous manufacturing process via a 1×N optical switch 120 (here, N=6) and excitation fibers 130a-130f (collectively, excitation fibers 130). The lasers 110 may be tunable lasers with overlapping, contiguous, or non-contiguous tuning ranges for probing different Raman bands. The Raman pump may also include lasers that emit at different discrete wavelengths for target Raman measurements.

The excitation fibers 130 are coupled to respective probes 140a-140f, which are located at different points or sites along the continuous manufacturing line 10. In this example, the manufacturing line 10 includes a media tank 11, perfusion cell culture tank 12, harvest tank 13, first chromatography site 14, second chromatography site 15, third chromatography site 16, filtration system 17, and drug substance tank 18. The first probe 140a monitors the perfusion cell culture 12; the second probe 140b monitors the harvest 13; the third, fourth, and fifth probes 140c-140e monitor the outputs of the chromatography sites 14-16; and the sixth probe 140f monitors the output of the filtration system 17.

Each remote measurement location has an associated spectrally selective filter 142a-142f, detector 150a-150f, and analog-to-digital converter 152a-152f. These components can either be located near the tunable laser 110 or at the corresponding remote measurement location as shown in FIG. 1A. There may be one detector 150 per measurement site as in FIG. 1A, either collocated with the corresponding probe or remotely coupled to the measurement site with an optical fiber. Alternatively, the system 100 may include a single filter, detector, and analog-to-digital converter that monitor all of the measurement sites or a subset of measurement sites, with a fiber network and fiber-coupled switch that switches among measurement sites in tandem with the switch 120 coupled to the Raman pump source.

Each detector 150 can be a photodiode, charge-coupled device (CCD) array, complementary metal-oxide-semiconductor (CMOS) array, photomultiplier tube (PMT), single-photon avalanche diode (SPAD), avalanche photodiode (APD), or any other device that can detect photons in the desired wavelength band, which may be defined by a narrowband filter. The spectrally selective detectors 150 can either be located together or separately along with any filters and/or associated electronic components. In either case, the corresponding optical fiber 130 may collect Raman emissions or signals from a given measurement site and couple them to the corresponding spectrally selective detector 150.

The plot at the bottom of FIG. 1A illustrates both the output of the tunable laser 110 and the Raman emissions/signals acquired by the detectors 150 at different times (here, times t=1 and t=N) as a function of wavelength. At time t=1, the laser 110 emits Raman pump light at a first (shorter) pump wavelength, and this light is coupled to a first measurement site (e.g., the perfusion cell culture tank 12). The switch 120 and corresponding optical fiber 130 couple the Raman pump light to the corresponding probe 140, which illuminates the substance to be measured at the measurement site (e.g., the cell culture) and couples the Raman signal emitted by the substance to the corresponding detector 150, which produces a photocurrent or other electrical signal representing the Raman spectrum. At a later time t=N, the laser 110 emits Raman pump light at a second (longer) pump wavelength, and this light is coupled to a different measurement site (e.g., the output of the filtration system 17). The switch 120 and corresponding optical fiber 130 couple the Raman pump light to the corresponding probe 140, which illuminates the substance to be measured at this measurement site (e.g., the filtered drug substance) and couples the Raman signal emitted by the substance to the corresponding detector 150, which generates a Raman spectrum at t=N. A processor coupled to the detector(s) 150 monitors these Raman spectra for peaks at particular wavelengths. These peaks may indicate the presence or absence of a particular analyte and can be used to trigger different actions along the manufacturing line 10.

The exact timing of the pump beam wavelength tuning and switching may depend on the process being monitored. For example, the laser 110 and switch 120 may operate in a round-robin fashion, switching among measurement sites in a sequential fashion, with the laser wavelength selected based on the analyte(s) expected at each measurement site. The laser 110 and switch 120 may also scan and switch Raman pump beam in other sequences, e.g., monitoring one or more sites more frequently than other sites. The laser 110 can be tuned continuously (e.g., in repeated chirps), switched among discrete wavelengths, or tuned nonlinearly, depending on the measurement sequence and the analytes/Raman transitions to be probed at each site.

Figure 1B:
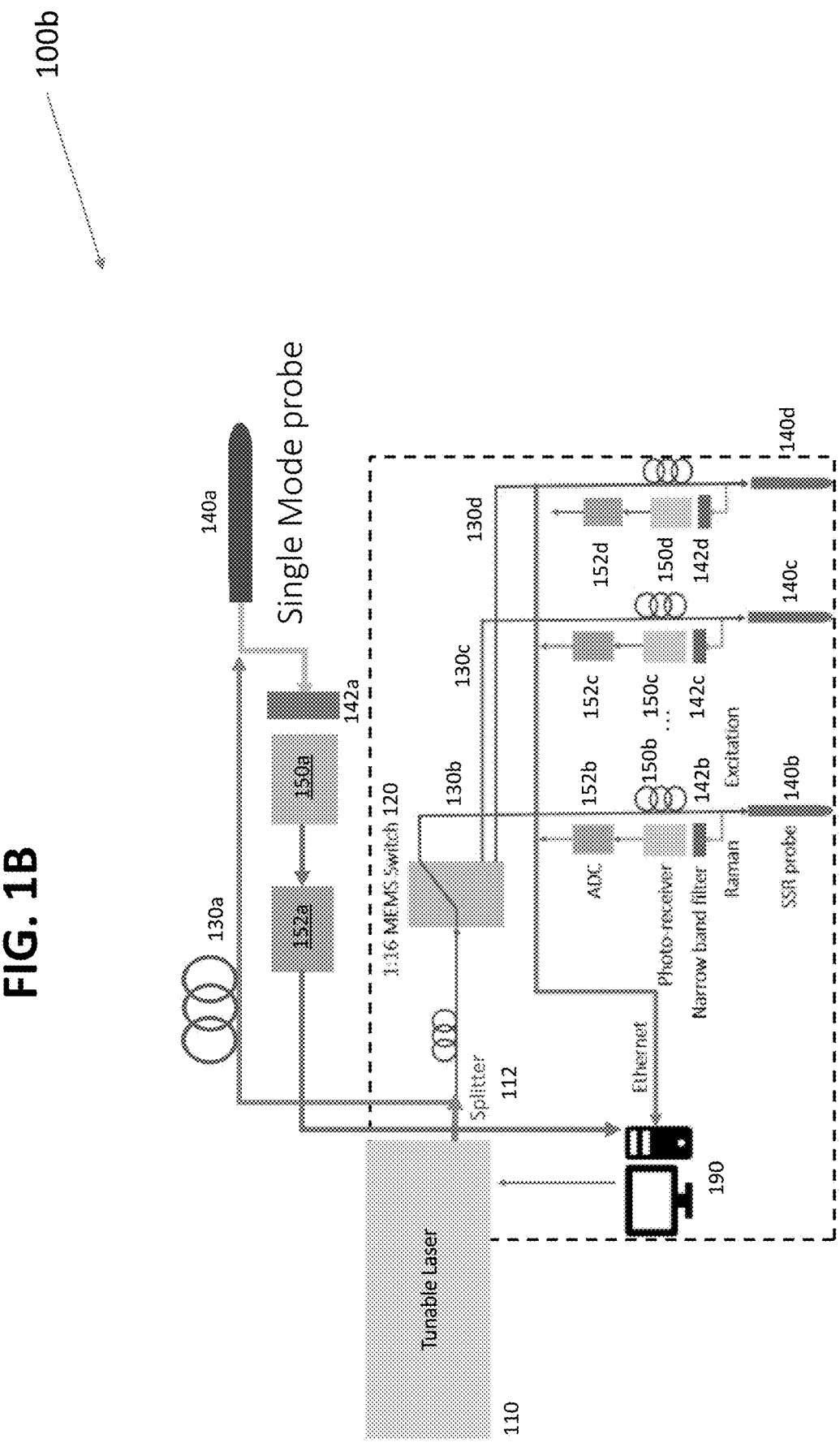
FIG. 1B shows a swept-source Raman sensor network with both single-mode and multimode probes and splitters and a switch for routing a tunable Raman pump beam among the probes.

FIG. 1B shows a SS-Raman sensor network 100b with different types of probes 140a-140d at different measurement sites. Each probe 140a-140d can operate at a different wavelength, with collection optics matched for either in-line (flow cell) measurement or external measurements. In this network 100b, the tunable laser 110 is coupled to the probes 140a-140d via a 1×2 splitter 112 with output coupled to the input of the switch 120 and another output coupled to probe 140a via optical fiber 130a. The outputs of the switch 120 are coupled to probes 140b-140d via respective optical fibers 130b-130d. Each probe 140a-140d is coupled to a collocated receiver, each of which includes a narrowband filter 142a-142d, a photodetector 150a-150d, and an analog-to-digital converter (ADC) 152a-152d. The ADCs 152a-152d are coupled to a processor 190 that analyzes the collected Raman spectra and controls the tunable laser 110 and the switch 120.

In operation, the tunable laser 110 emits a Raman pump that is coupled to the first probe 140a directly via the coupler 112 and to one of the other probes 140b-140d via the coupler 112 and the switch 120. These probes 140 illuminate analytes at different sites, producing Raman signals. The filters 142 pass the Raman signals to the photodetectors 150 and block light at other wavelengths, including the excitation wavelength(s). The photodetectors 150 generate analog electrical outputs, such as photocurrents, that represent the detected Raman signals, and the ADCs 152 digitize these analog electrical outputs, producing digital electronic signals suitable for analysis and processing by the processor 190.

Figure 1C:
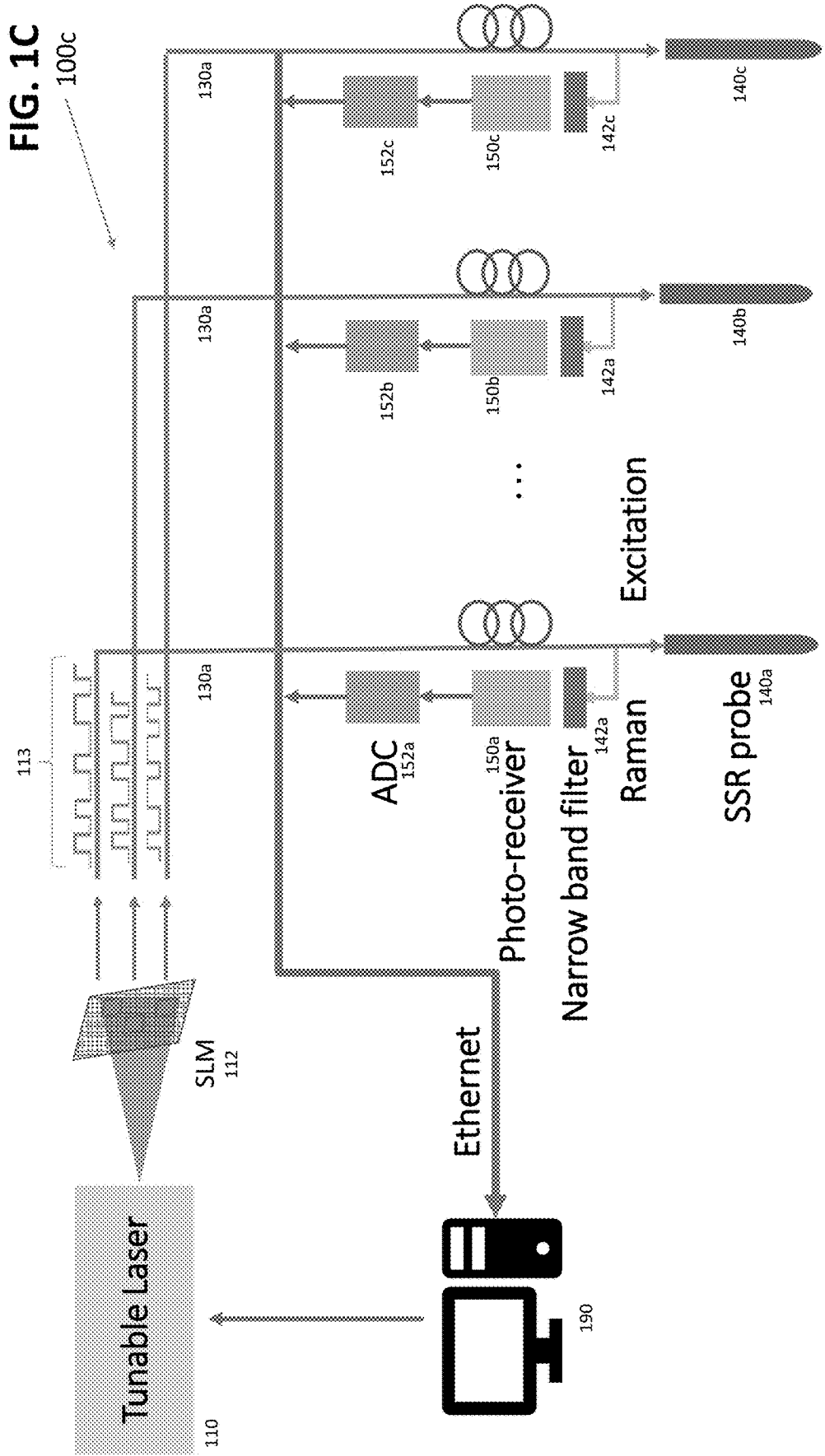
FIG. 1C shows a swept-source Raman sensor network with a spatial light modulator (SLM) that modulates Raman pump beams for different measurement sites with unique waveforms.

FIG. 1C shows a multiplexed Raman sensor network 100c with Raman pump beams that are encoded with different waveforms 113 with an SLM 112 or one or more other modulators (e.g., fiber-coupled, electro-optic intensity modulators) that is coupled to the tunable laser 110. The waveforms 113 can be codes that are uniquely assigned to the different measurement sites for concurrent or temporally overlapping code-division multiplexed (CDM) measurements. For example, the waveforms can be temporally shifted versions of a pseudo-random bit sequence (PRBS) that have low cross-correlation coefficients.

Figure 1D:
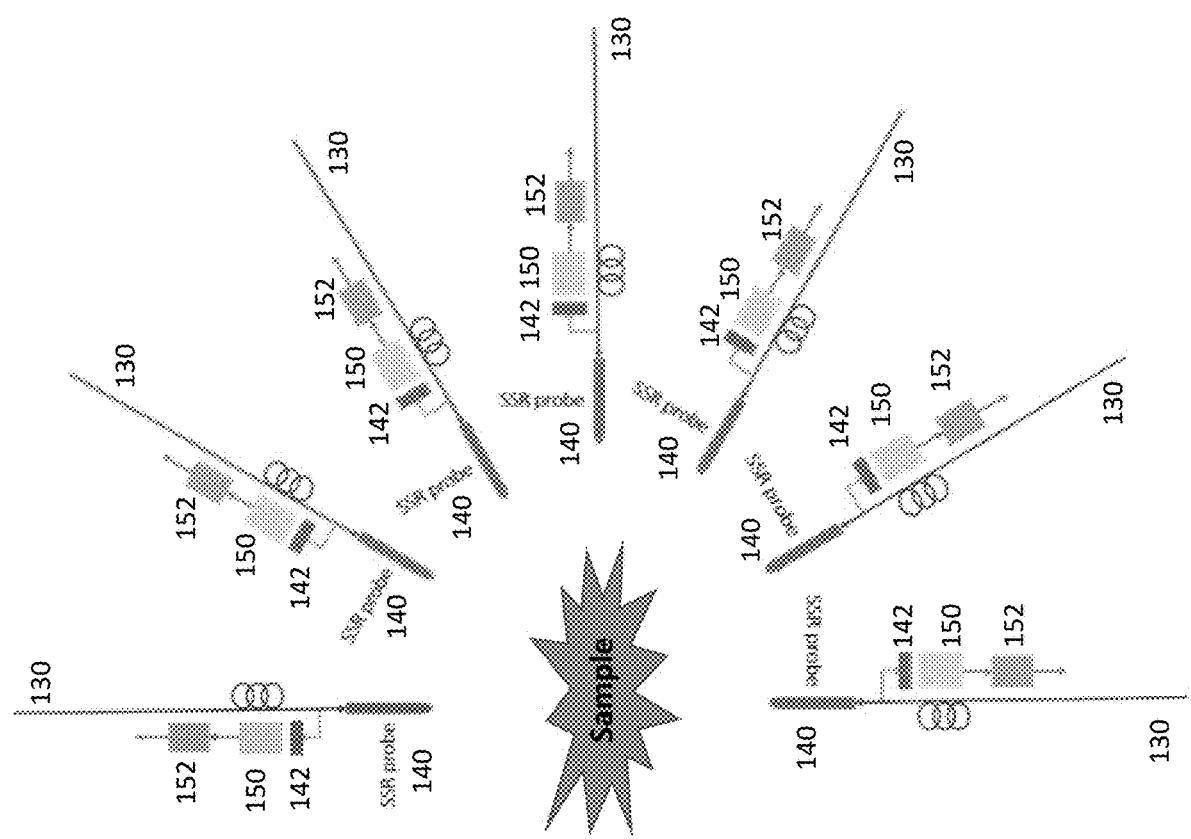
FIG. 1D illustrates how multiple probes in a swept-source Raman sensor network can be used to excite and detect Raman signals from a single sample.

The probes 140 do not have to be at different sites; multiple probes 140 can be used to measure one or more collocated analytes as shown in FIG. 1D. The probes 140 can be arranged to illuminate the analyte(s) from different positions and/or different directions. In FIG. 1D, for example, the probes 140 are arranged in a semi-circular array centered on the sample. Depending on the couplers and/or switches used to couple the pump beam from the laser 110 to the probes 140, each probe 140 can excite the sample in turn, with some or all of the detectors 150 collecting a portion of the Raman signal emitted by the sample.

Each probe 140 can include optics, such as static masks, MEMS switches, and active SLMs, that modulate the amplitude and/or phase of the emitted Raman pump beam. By choosing the modulation pattern and/or illumination angles appropriately, it is possible to generate a hyperspectral, super-resolved Raman image of the sample from the Raman signals sensed by the detectors 150. (In a system like this, a detector array can be used instead of single-element detectors, with different pixels or groups of pixels in the detector array dedicated to different probes.) They can also be used to generate a 3D image or point cloud representing the sample. For example, the system can measure a sample of known geometry or chemical composition, then utilize supervised learning approaches, such as neural networks, to take the Raman input and reconstruct a representation of the sample.

Figure 2A:
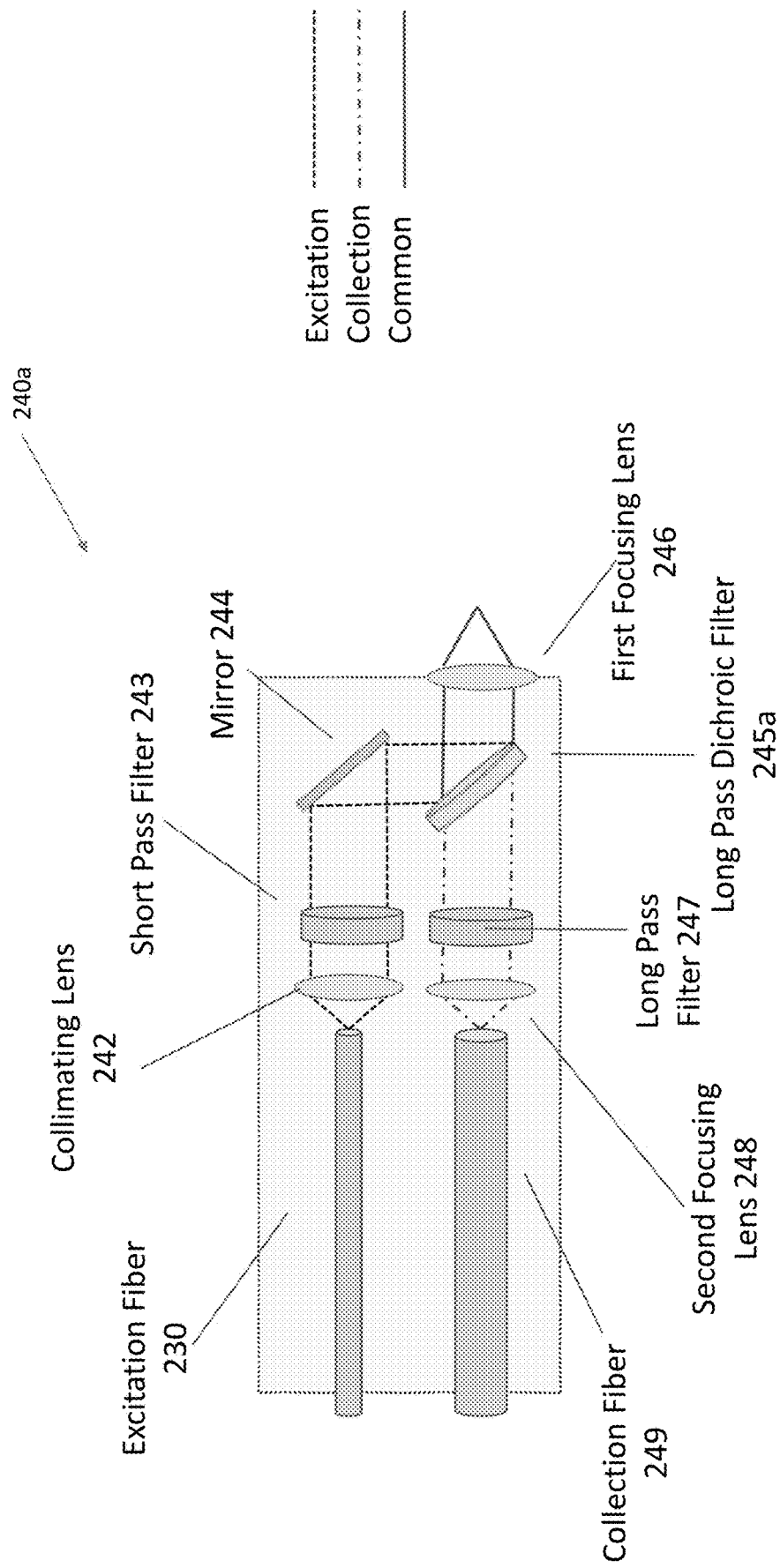
FIG. 2A shows a swept-source Raman Stokes probe with a long-pass dichroic filter suitable for use with a swept-source Raman sensor network.
Figure 2B:
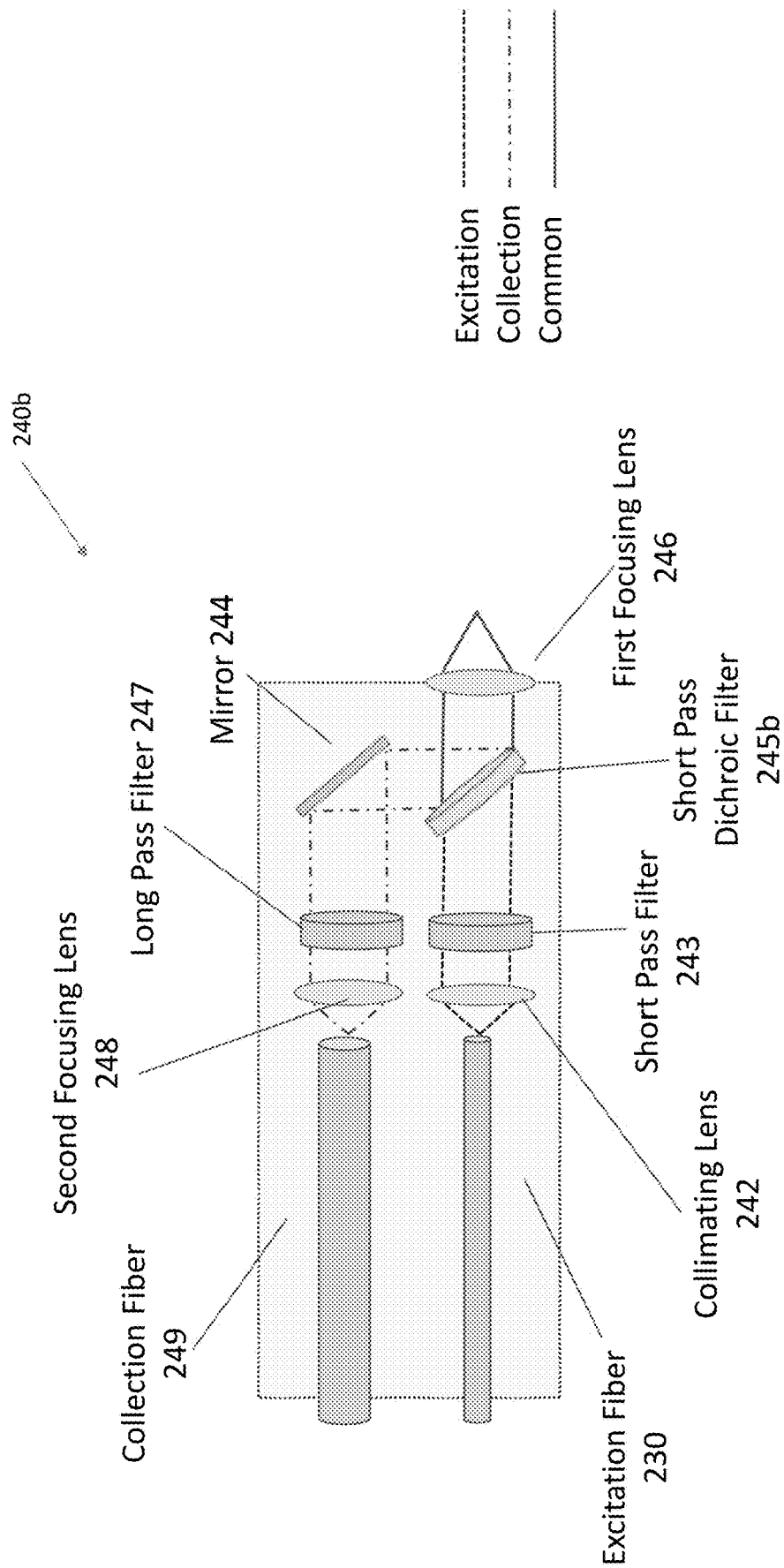
FIG. 2B shows a swept-source Raman Stokes probe with a short-pass dichroic filter suitable for use with a swept-source Raman sensor network.

SS-Raman Probes for Measuring Stokes-Shifted and Anti-Stokes Shifted Raman Signals FIGS. 2A and 2B show probes 240a and 240b, respectively, for measuring Stokes-shifted Raman signals. These probes 240a and 240b can be used to monitor remote measurement sites in swept-source Raman sensor networks like those shown in FIGS. 1A-1D. For measurements of Stokes-shifted Raman signals, each probe 240a/240b includes a collimating lens 242, a short-pass filter 243, a mirror 244, a dichroic filter/beam splitter 245a or 245b, a first focusing lens 246, a long-pass filter 247, and a second focusing lens 248. The filters' cut-off wavelengths are matched to the maximum tuning wavelength of the Raman pump beam. For Stokes measurements, for example, the short-pass filter 243 has a cut-off wavelength at the maximal tuning wavelength or higher. The dichroic filter 245a has a cut-off wavelength at the maximal tuning range and the long-pass filter 247 has a cut-off wavelength equal to the maximum tuning wavelength or longer. The dichroic filter 245a and long-pass filter 247 provide additional suppression of residual excitation light. For anti-Stokes measurements, the minimal tuning wavelength determines the filters' cut-off wavelengths.

The collimating lens 242 is in optical communication with the excitation fiber 430, which guides the excitation beam emitted by the tunable laser (e.g., tunable laser 110 in FIGS. 1A and 1B). The short-pass filter 243 is in optical communication with the collimating lens 242 and rejects amplified spontaneous emission (ASE) noise emitted by the tunable laser 110 and guided by fiber 230 to the probe 240.

In FIG. 2A, the mirror 244 reflects the excitation beam transmitted by the short-pass filter 243 toward the dichroic filter 245a, which is a long-pass dichroic filter. The long-pass dichroic filter 245a reflects the excitation beam to the first focusing lens 246, which focuses the excitation beam on or inside the sample (not shown). The first focusing lens 246 also collects a portion of the Raman signal emitted by the sample in response to the excitation beam. The long-pass dichroic filter 245a transmits the Raman signal to the long-pass filter 247, which transmits the Raman signal to the second focusing lens 248. The second focusing lens 248 couples the Raman signal into the collection fiber 249, which may be a large-mode area or multimode fiber for greater collection efficiency, and which guides the Raman signal to the photodetector.

In FIG. 2B, the dichroic filter 245b is a short-pass dichroic filter and transmits the excitation beam transmitted by the short-pass filter 243 to the first focusing lens 246, which focuses the excitation beam on or inside the sample (not shown). As in FIG. 2A, the first focusing lens 246 also collects a portion of the Raman signal emitted by the sample in response to the excitation beam. The short-pass dichroic filter 245b reflects the Raman signal to the mirror 244, which reflects the Raman signal to the long-pass filter 247, which transmits the Raman signal to the second focusing lens 248. The second focusing lens 248 couples the Raman signal into the collection fiber 249, which guides the Raman signal to the photodetector.

Figure 3A:
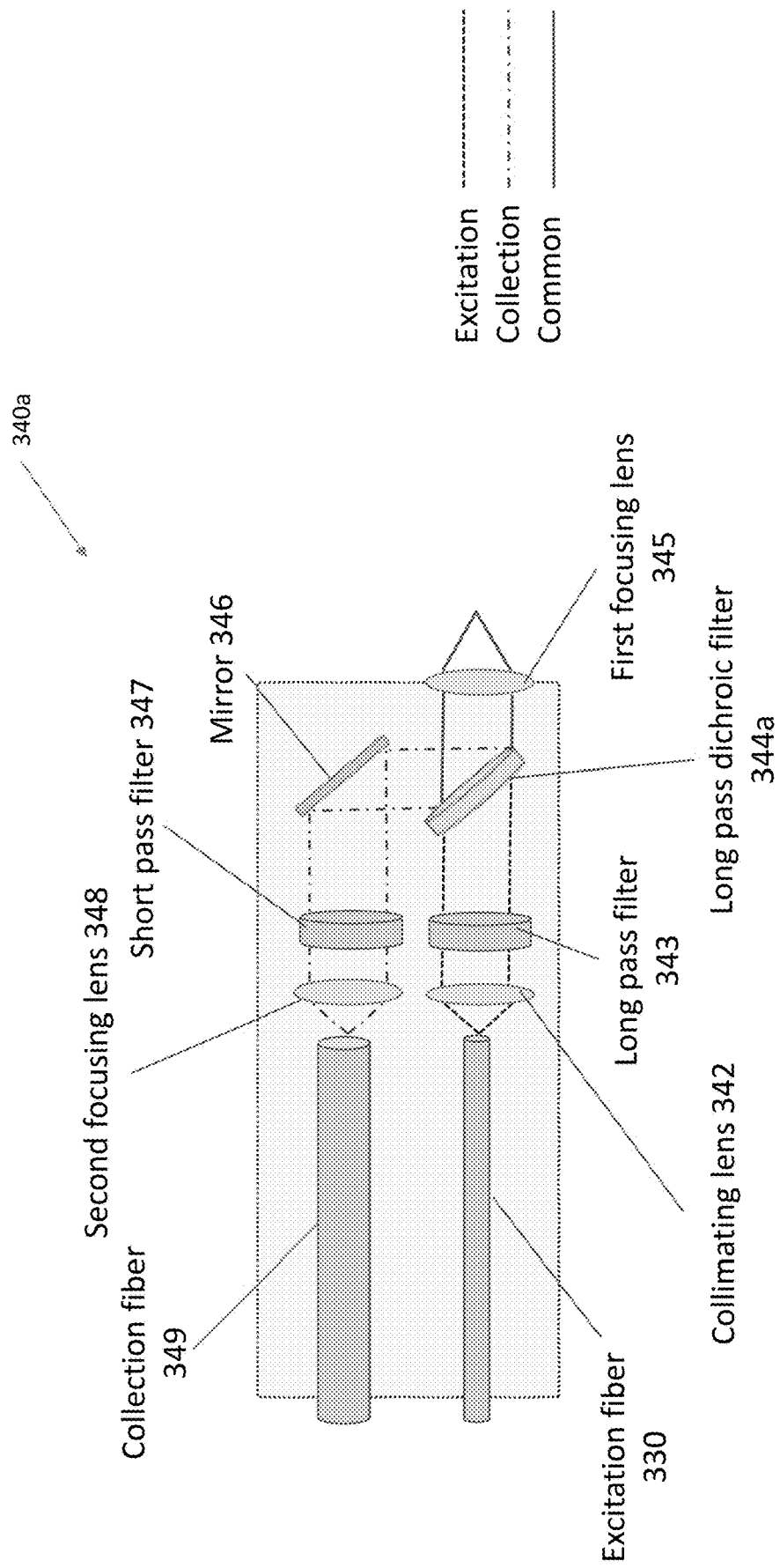
FIG. 3A shows a swept-source Raman anti-Stokes probe with a long-pass dichroic filter suitable for use with a swept-source Raman sensor network.
Figure 3B:
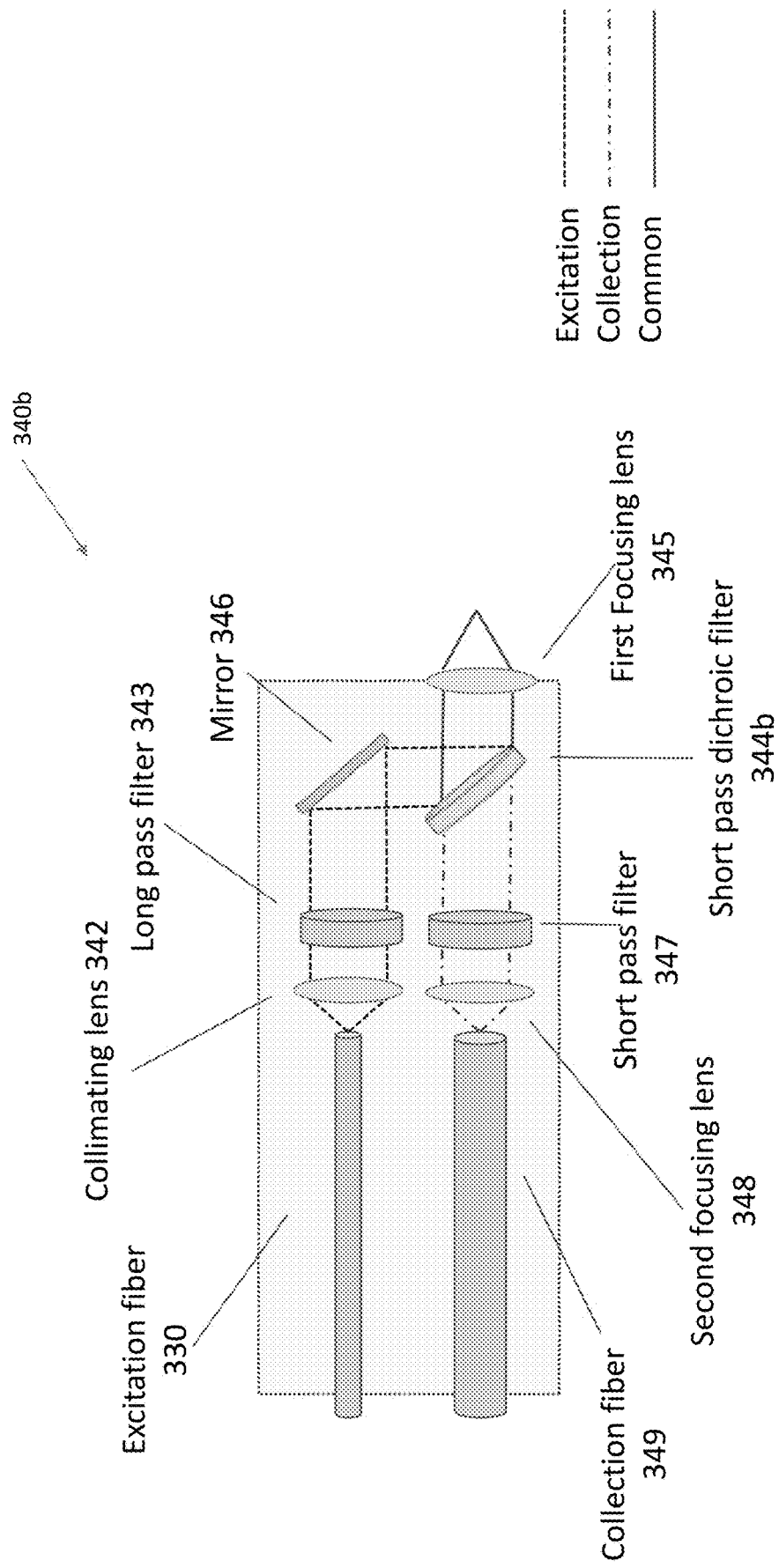
FIG. 3B shows a swept-source Raman anti-Stokes probe with a short-pass dichroic filter suitable for use with a swept-source Raman sensor network.

FIGS. 3A and 3B show probe 340a and 340b, respectively, for measuring anti-Stokes shifted Raman signals at remote measurement sites in swept-source Raman sensor networks like those shown in FIGS. 1A-1C. For measurements of anti-Stokes shift Raman signals, each probe 340a/340b includes a collimating lens 342, long-pass filter 343, dichroic filter 344a/344b, first focusing lens 345, mirror 346, short-pass filter 347, and second focusing lens 348. The collimating lens 342 collimates the excitation beam, which is guided to the probe 340a/340b by an excitation fiber 330 coupled to the tunable laser (e.g., tunable laser 110 in FIGS. 1A and 1B). The long-pass filter 343 passes the excitation beam and rejects ASE noise emitted by the tunable laser.

In FIG. 3A, the dichroic filter 344a is a long-pass dichroic filter and transmits the excitation beam transmitted by the long-pass filter 343 to the first focusing lens 345, which focuses the excitation beam on or inside the sample (not shown). The first focusing lens 345 also collects a portion of the Raman signal emitted by the sample in response to the excitation beam. The long-pass dichroic filter 344a reflects the Raman signal to the mirror 344, which reflects the Raman signal to the short-pass filter 347, which transmits the Raman signal to the second focusing lens 348. The second focusing lens 348 couples the Raman signal into a collection fiber 349, which guides the Raman signal to the corresponding photodetector (e.g., photodetector 150 in FIG. 1A).

In FIG. 3B, the mirror 346 reflects the excitation beam to the dichroic filter 344b, which is a short-pass dichroic filter. The short-pass dichroic filter 344b reflects the excitation beam to the first focusing lens 346, which focuses the excitation beam on or inside the sample (not shown). Again, the first focusing lens 346 collects a portion of the Raman signal emitted by the sample in response to the excitation beam. The short-pass dichroic filter 344b transmits the Raman signal to the short-pass filter 347, which transmits the Raman signal to the second focusing lens 348, which in turn couples the Raman signal into the collection fiber 349.

Figure 4:
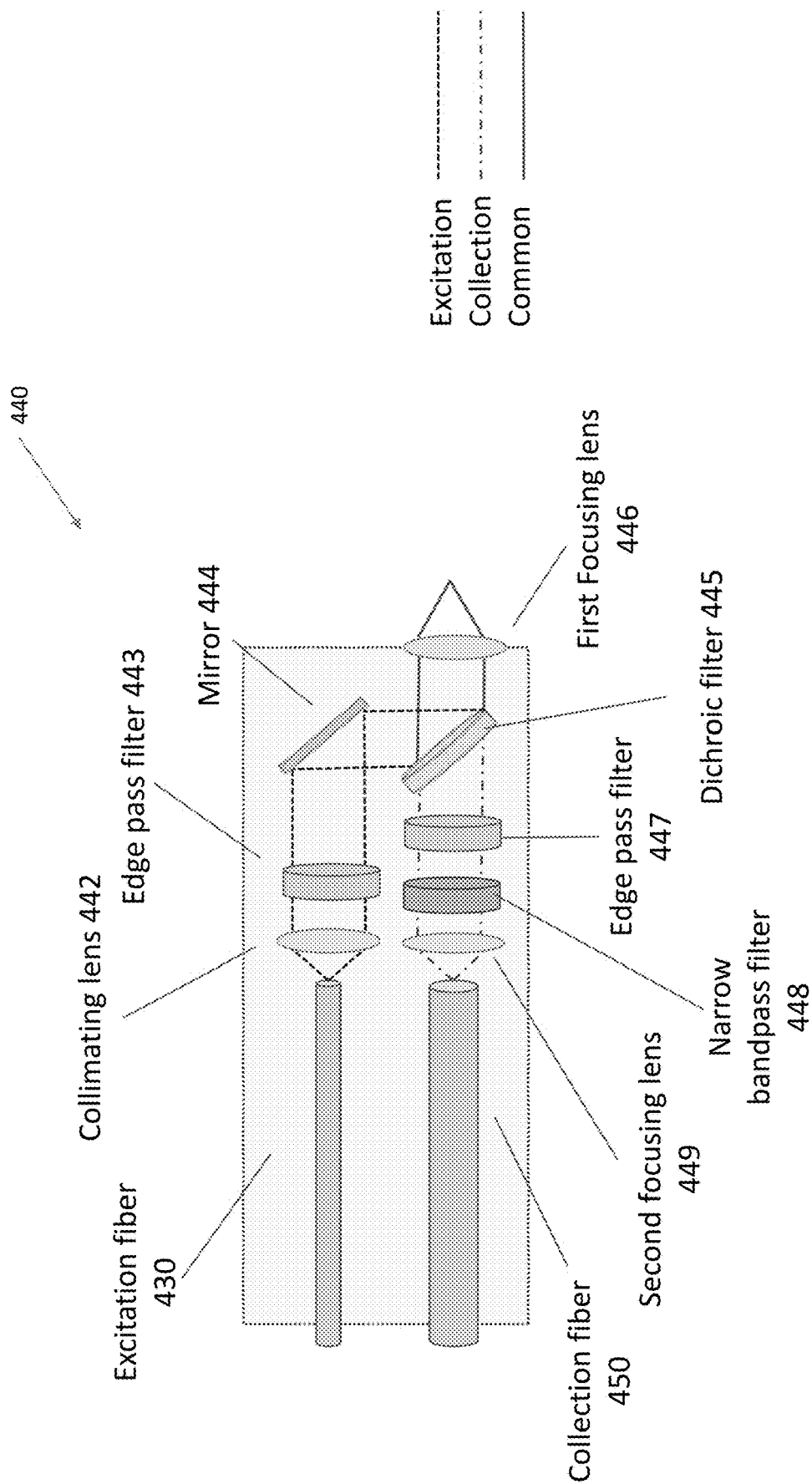
FIG. 4 shows a probe with a bandpass filter suitable for use with a swept-source Raman sensor network.

FIG. 4 shows a probe 440 that includes an internal narrowband bandpass filter 448 and can be configured for either Stokes or anti-Stokes measurements depending on the passbands and cutoff wavelengths of its filters. Like the probes described above, the probe 440 in FIG. 4 includes a collimating lens 442, edge-pass filter 443, mirror 444, dichroic filter 445, first focusing lens 446, edge-pass filter 447, and second focusing lens 449. The bandpass filter 448 is between the edge-pass filter 447 and second focusing lens 449.

In operation, the collimating lens 442 collimates the excitation beam, which is guided to the probe 440 by an excitation fiber 430 coupled to the tunable laser (e.g., tunable laser 110 in FIGS. 1A and 1B). The edge-pass filter 443 passes the excitation beam and rejects ASE noise emitted by the tunable laser. The mirror 444 reflects the excitation beam to the dichroic filter 445, which reflects the excitation beam to the first focusing lens 446, which directs the excitation beam to the sample (the mirror 444 and dichroic filter 445 can also be swapped as in FIGS. 2B and 3A). The first focusing lens 446 couples a portion of the Raman signal from the sample to the dichroic filter 445, which transmits the Raman signal to the edge-pass filter 447. The edge-pass filter 447 and bandpass filter 448 transmit the Raman signal and reject light at other wavelengths. The second focusing lens 449 couples the filtered Raman signal into a collection fiber 450, which guides the filtered Raman signal to a photodetector for detection.

Figure 5:
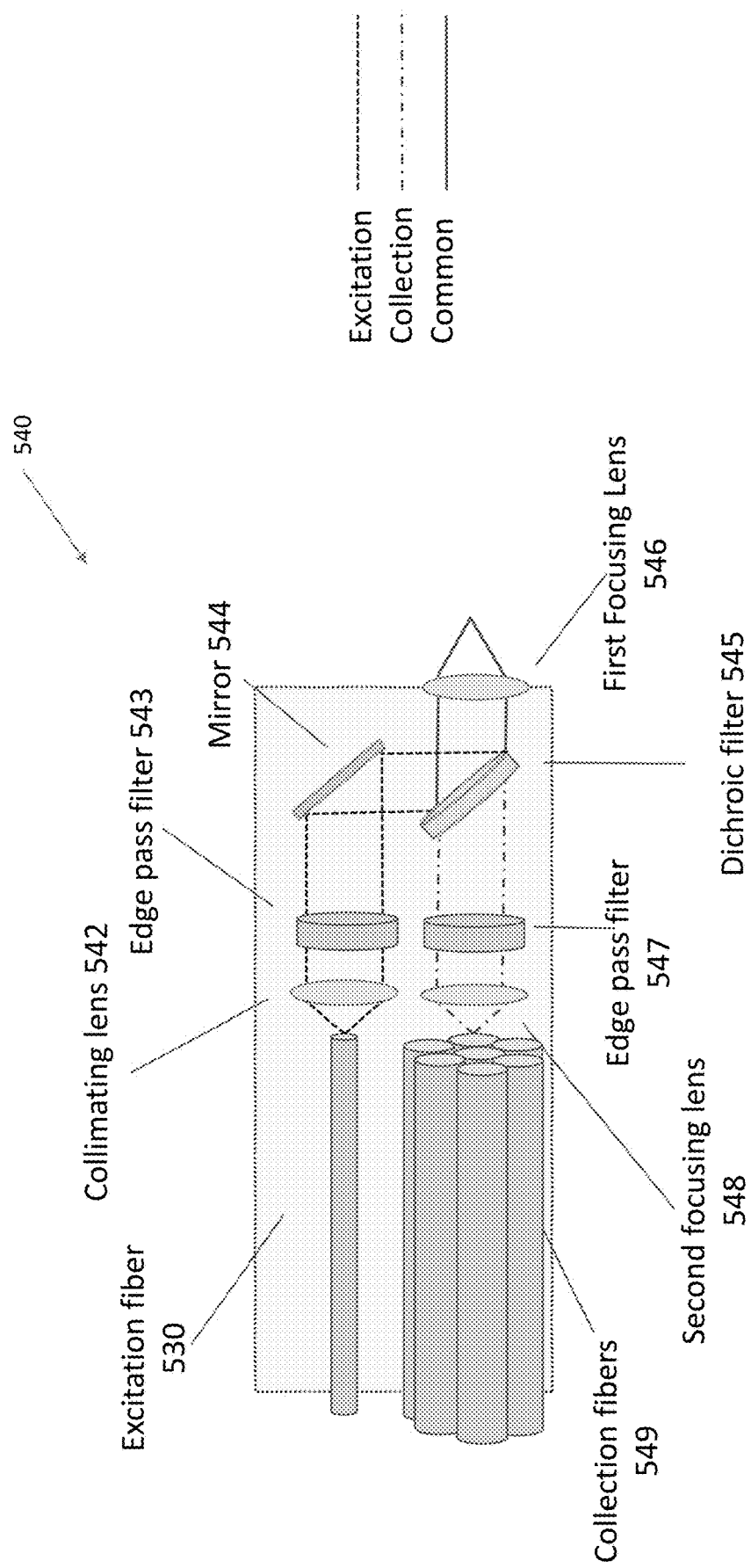
FIG. 5 shows a probe with multiple collection fibers suitable for use with a swept-source Raman sensor network.

FIG. 5 shows a probe 540 that includes multiple collection fibers 549 for increased Raman signal collection efficiency. It can be configured for either Stokes or anti-Stokes measurements depending on the passbands and cutoff wavelengths of its filters and can be used for remote measurements in a Raman sensor network. Like the probes described above, the probe 540 in FIG. 5 includes an excitation fiber 530, collimating lens 542, edge-pass filter 543, mirror 544, dichroic filter 545, first focusing lens 546, edge-pass filter 547, and second focusing lens 548. (It may also include a bandpass filter as in FIG. 4). The probe 540 and its components operate as described above with respect to FIGS. 2A, 2B, 3A, 3B, and 4. In this case, however, the second focusing lens 548 couples light into a bundle of collections fiber 549, each of which can be single-mode, multimode, or large-mode-area. This allows the probe 549 to capture more Raman signal photons, increasing the signal-to-noise ratio and improving probe sensitivity.

Figure 6:
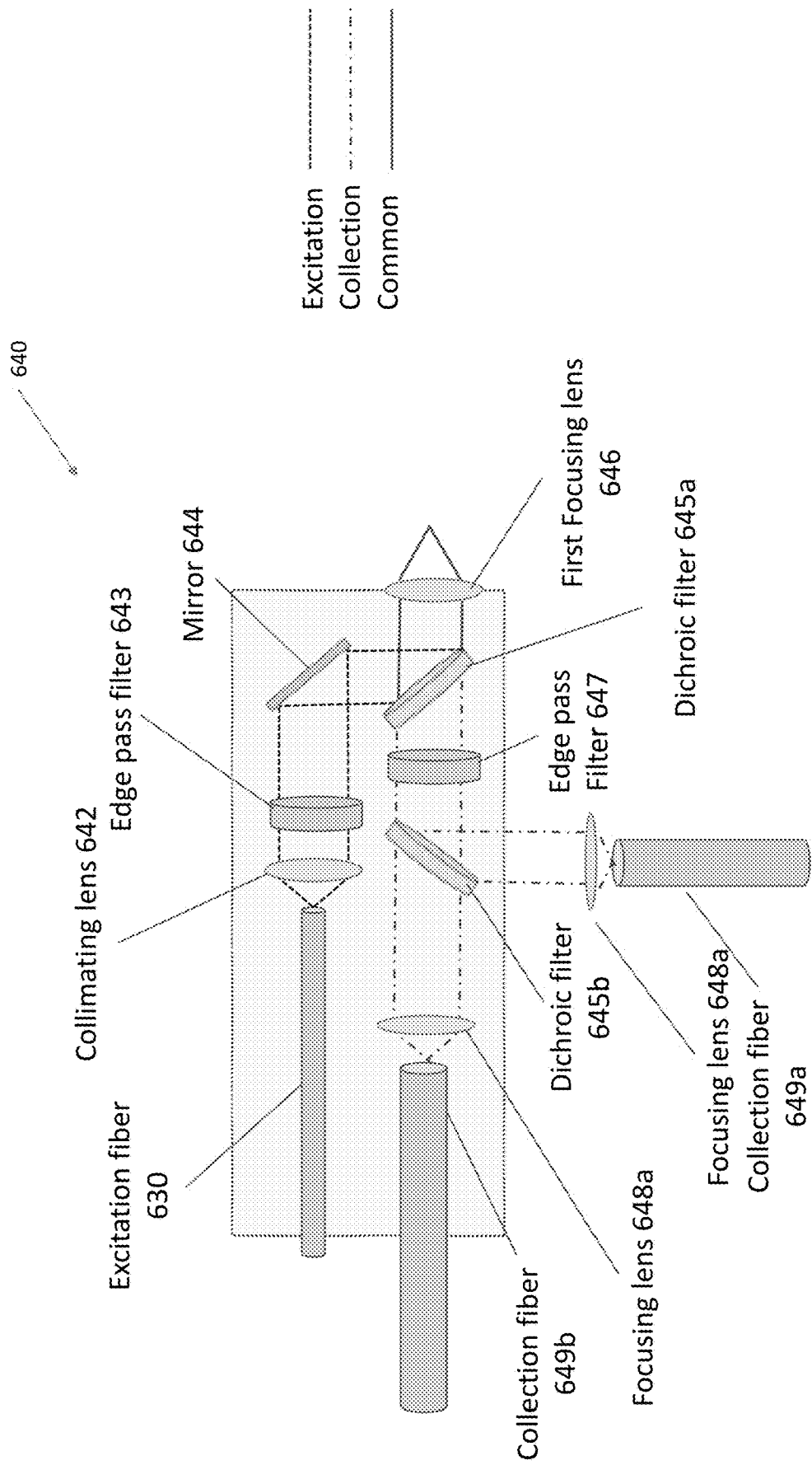
FIG. 6 shows a probe with cascaded dichroic filters suitable for use with a swept-source Raman sensor network.

FIG. 6 shows a probe 640 with cascaded dichroic filters 645a and 645b for monitoring different Raman bands simultaneously. This probe 640 can be configured for either Stokes or anti-Stokes measurements depending on the passbands and cutoff wavelengths of its filters and can be used for remote measurements in a Raman sensor network. Like the probes described above, the probe 640 in FIG. 6 includes an excitation filter 630, collimating lens 642, edge-pass filter 643, mirror 644, (first) dichroic filter 645a, first focusing lens 646, edge-pass filter 647, second focusing lens 648a, and (first) collection fiber 649a. (It may also include one or more bandpass filters as in FIG. 4 and can be used with multiple collection fibers as in FIG. 5). The probe 640 also includes a second dichroic filter 645b, third focusing lens 648b, and (second) collection fiber 649b.

The probe 640 and its components operate like the probes described above, except that the edge-pass filter 647 transmits the filter Raman signal to the second dichroic filter 645b instead of directly to the second focusing lens 648a. The second dichroic filter 645b directs a portion of the Raman signal below its cutoff wavelength in one direction (e.g., to focusing lens 648a and collection fiber 649a) and a portion of the Raman signal above its cutoff wavelength in a different direction (e.g., to focusing lens 648b and collection fiber 649b). Each collection fiber 649a, 649b is guides the corresponding portion of the Raman signal to a photodetector dedicated to monitoring that portion of the Raman band. Other probes may have more dichroic filters, focusing lenses, and collection fibers to monitor more than two Raman bands simultaneously. For example, the cutoff wavelengths of the dichroic filters and/or other filters can be selected perform simultaneous Stokes and anti-Stokes measurements.

Probes with Circumferentially Arranged Collection Fibers

Figure 7A:
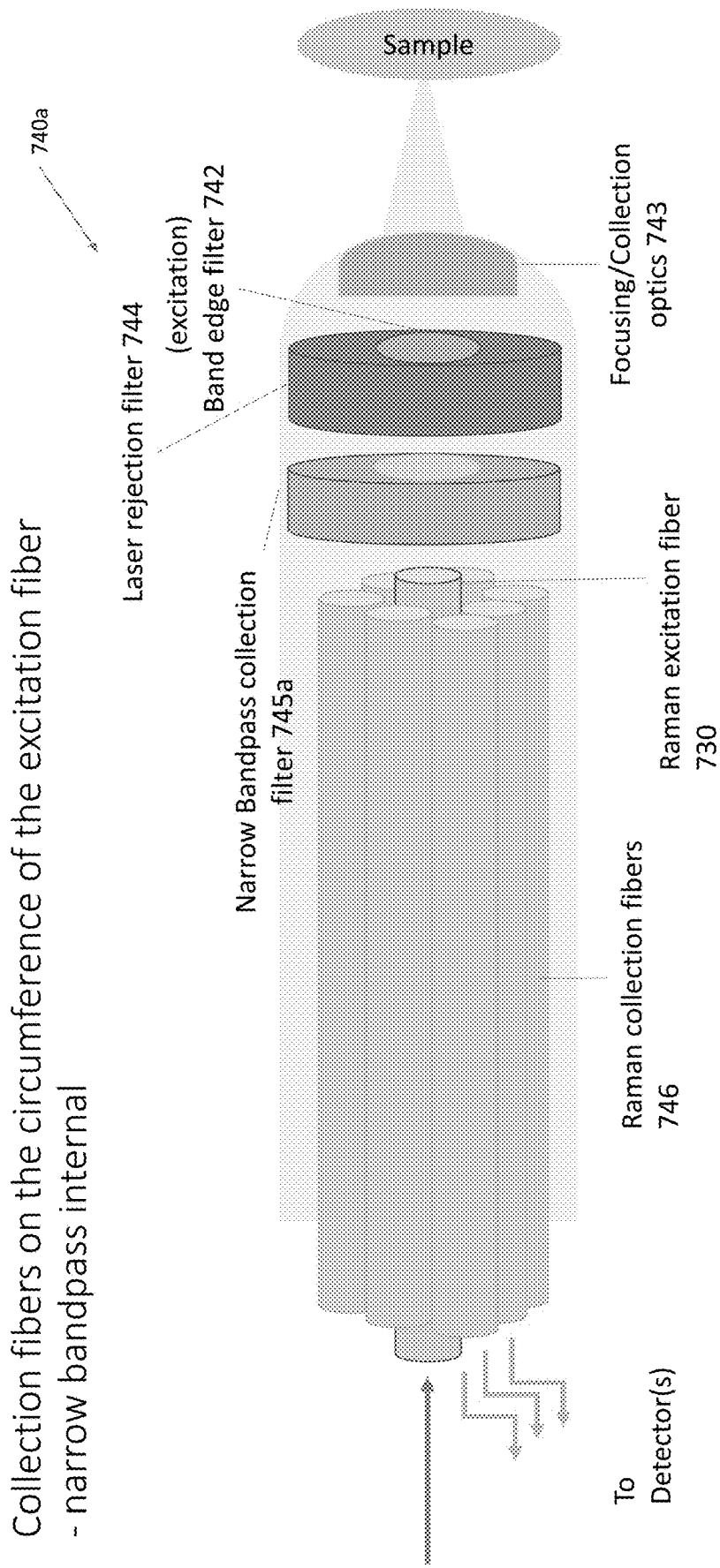
FIG. 7A shows a probe with collection fibers arranged circumferentially about a central excitation fiber suitable and an integrated bandpass filter for use with a swept-source Raman sensor network.
Figure 7B:
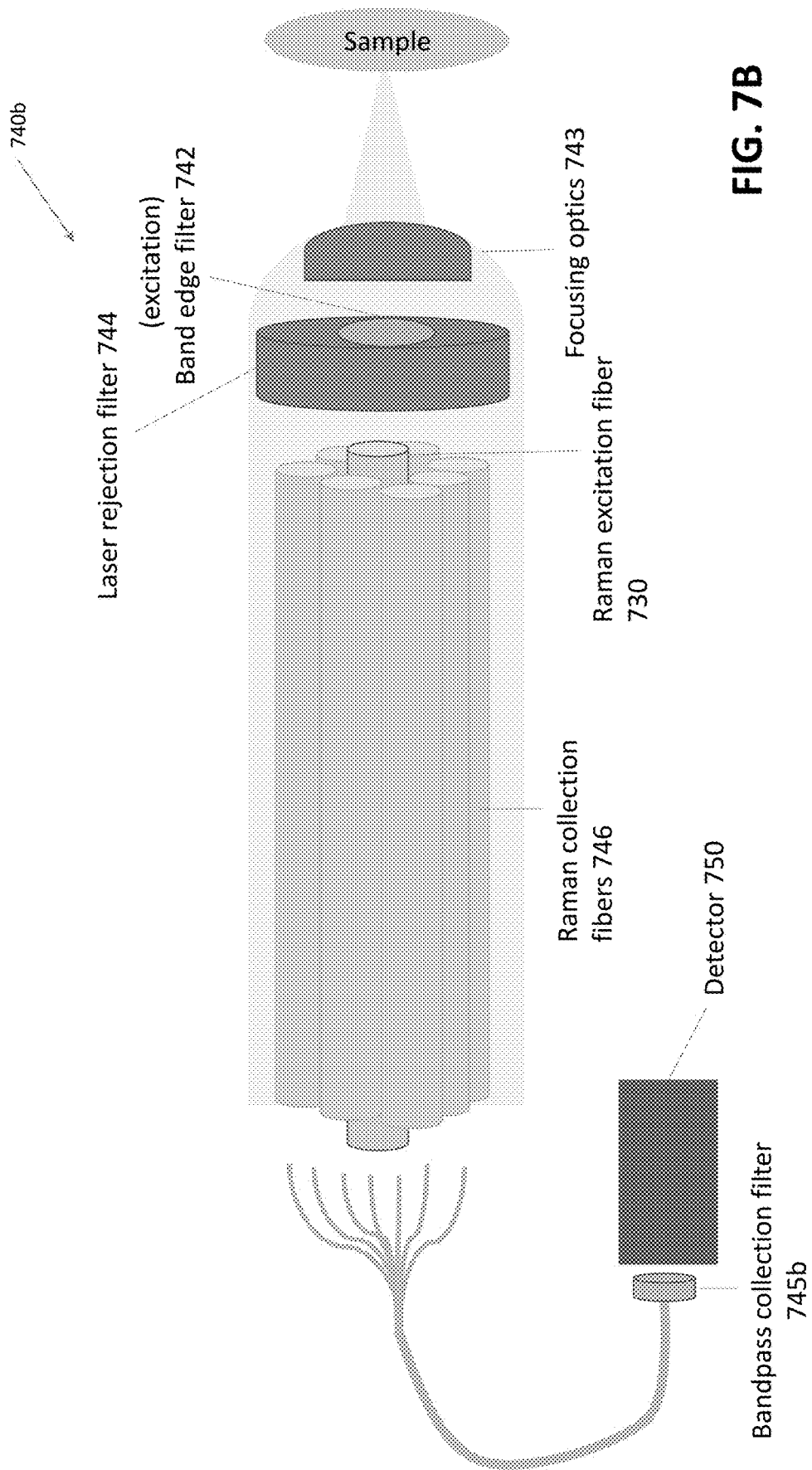
FIG. 7B shows a probe with collection fibers arranged circumferentially about a central excitation fiber suitable and an external bandpass filter for use with a swept-source Raman sensor network.

FIGS. 7A and 7B show probes 740a and 740b, respectively, with Raman collection fibers 746 arranged concentrically about an excitation fiber 730 in a compact design. Like the probes described above, these probes 740a and 740b can be used to monitor remote measurement sites in swept-source Raman sensor networks like those shown in FIGS. 1A-1C. In addition to the optical fibers, each probe 740a/740b includes a band-edge filter 742, focusing/collection optics 743, laser rejection filter 744, and narrowband bandpass filter 745a/745b. The band edge filter 742 is disposed between the excitation fiber 730 and the optics 743 and passes the excitation beam and rejects light at other wavelengths, including ASE (amplified spontaneous emission) light and/or stimulated Brillouin scattering generated by the excitation beam in the excitation fiber 730. The optics 743 focus the excitation beam on or into the sample and collect the Raman signal emitted by the sample in response to the excitation beam.

The laser rejection filter 744 is ring- or annular-shaped, with the hole in the center passing the excitation beam from the excitation fiber. It can be disposed about the circumference of the band-edge filter 742 and in between the optics 743 and the collection fibers 746. The laser rejection filter 744 passes the Raman signal and rejects light at the excitation beam wavelength(s).

In FIG. 7A, the bandpass filter 745a is integrated between the fibers and laser rejection filter 744 and is also ring- or annular-shaped, with the hole in the center passing the excitation beam from the excitation fiber. In FIG. 7B, the bandpass filter 745b is at the distal end of the collection fiber 746 instead of in the probe 740b itself and is disposed between the collection fiber 746 and a detector 750. In both cases, the bandpass filter 745a/746b transmits light in the Raman band and rejects light at other wavelengths.

Narrowband Filter Detection

Figure 8A:
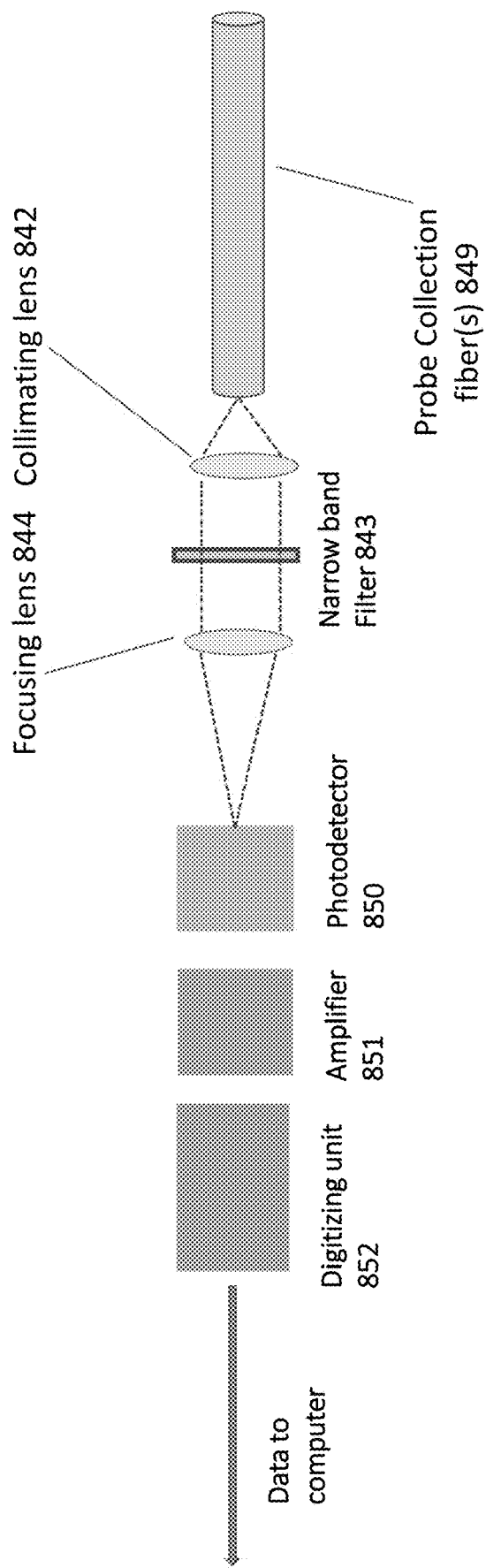
FIG. 8A shows an external narrowband filter and receiver components for one or more probes in a swept-source Raman sensor network.
Figure 8B:
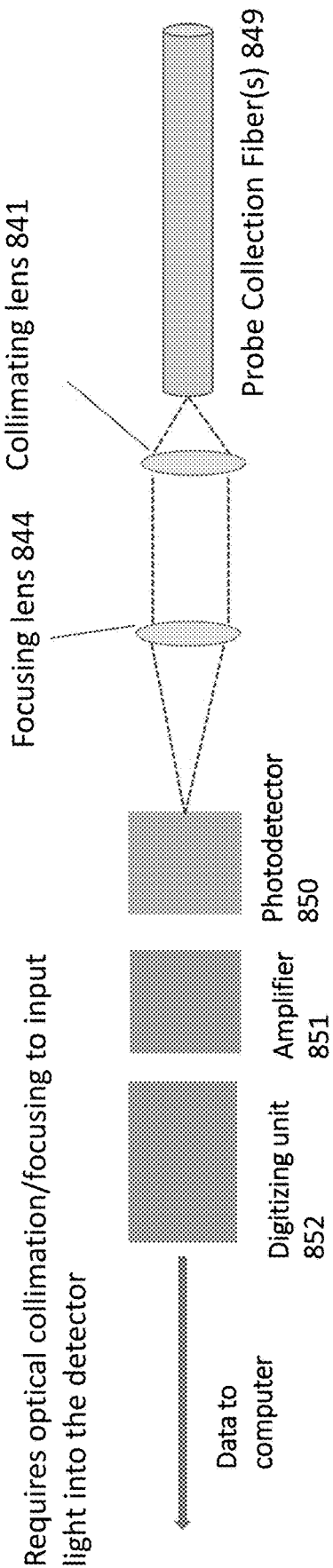
FIG. 8B shows a detector arrangement for a probe with an internal narrowband filter.
Figure 8C:
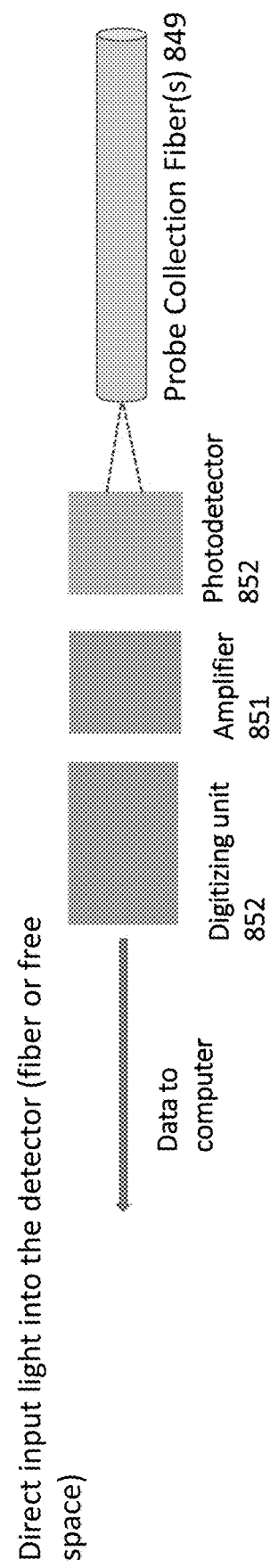
FIG. 8C shows another detector arrangement for a probe with an internal narrowband filter.

FIGS. 8A-8C illustrate different schemes for detecting narrowband-filtered Raman signals collected with probes like those described above. FIG. 8A shows an external narrowband filter detection scheme with a bulk-optic narrowband filter 843 (e.g., as in the probe 740b shown in FIG. 7B). This narrowband filter 843 filters Raman signals that are guided from a probe (not shown) by a collection fiber 849 and collimated with a collimating lens 842. Another lens 844 focuses the filtered Raman signals onto a detector 850, which transduces them into electrical signals, which are amplified and digitized by an amplifier 851 and ADC 852, respectively, for further processing. The étendue of the detector should be equal or greater to that of the collection fiber 849 or the optical component with the lowest light collection efficiency.

FIGS. 8B and 8C show schemes for detect Raman signals collected with probes that have internal narrowband filters (e.g., probes 440 and 740a in FIGS. 4 and 7A, respectively). In FIG. 8B, the collimating lens 842 and focusing lens 844 couple the Raman beam from the collection fiber 849 to the active area of the detector 850. In FIG. 8C, the collimating lens 842 and focusing lens 844 are omitted, and the collection fiber 849 shines the Raman beam directly on the active area of the detector 850. (The collection fiber 849 can also be butt-coupled to the detector 850.) In both of these schemes, the étendue of the detector should be equal or greater to that of the collection fiber 849 or the optical component with the lowest light collection efficiency for maximum detection efficiency.

Flow Cells

Figures 9A, 9B:
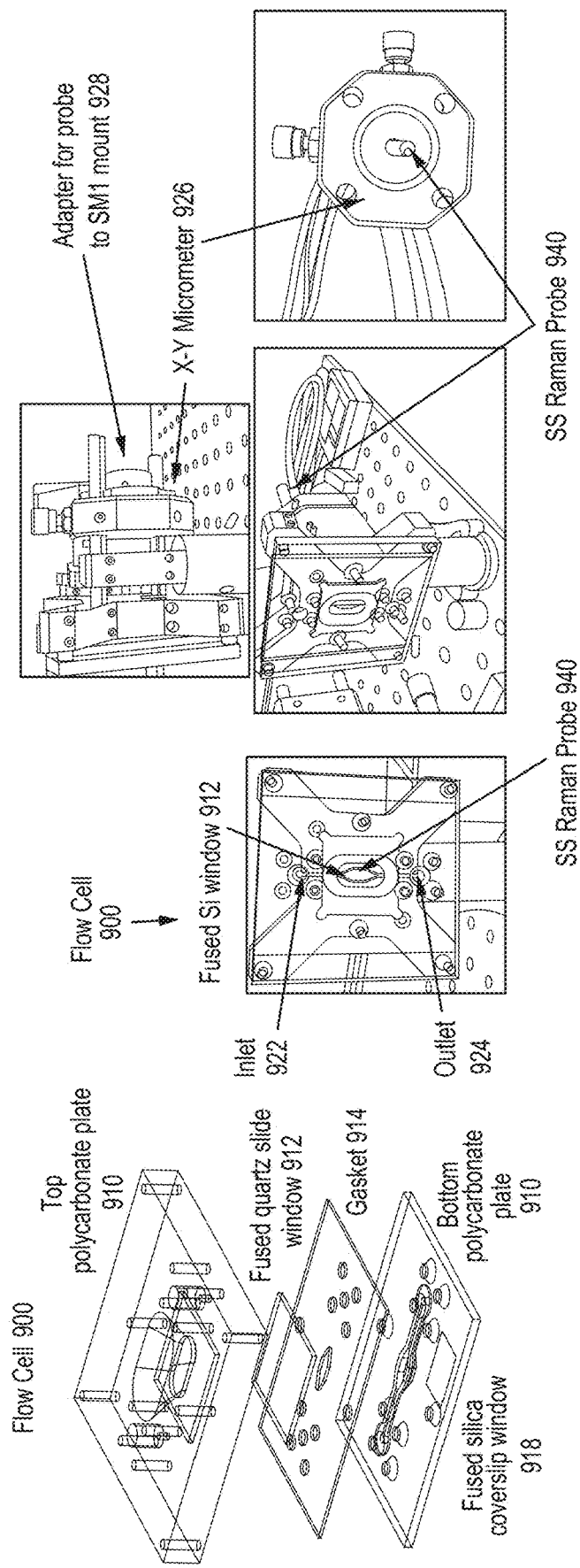
FIG. 9A shows an exploded view of a flow cell interface for a swept-source Raman probe.
FIG. 9B shows photographs of a flow cell interface for a swept-source Raman probe.

FIGS. 9A and 9B show a flow cell 900 suitable for use at a point in a continuous flow manufacturing line or another measurement site monitored by a swept-source Raman sensor network with any of the probes described above. The body material of the flow cell can be machined from materials, such as aluminum or polycarbonate. The flow cell 900 includes a top plate 910 and a bottom plate 916 that are secured to each other to create a channel or cavity for flowing liquids via an inlet 922 and an outlet 924. A gasket 914 between the plates seals the channel to prevent leaks. A fused silica coverslip 918 covering a portion of the channel allows a SS-Raman probe 940 to illuminate the liquid with a Raman pump beam and to detect Raman signals emissions from the liquid. An X-Y micrometer 926 and adapter mount 928 can be used to position the probe 940 with respect to the flow cell 900. A fused silica window 912 provides an optical viewport as well as a means to minimize background Raman signal in the case a thermoplastic is used as the body material. This view window can be substituted with a mirror or optical cavity to increase the interaction length of the excitation beam and enhance the Raman signal.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of" when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A system for measuring Raman signals at more than one measurement site along a continuous flow manufacturing line, the system comprising:
   a tunable laser to emit a tunable excitation beam;
   a fiber optic splitter, in optical communication with the tunable laser, to couple a different portion of the tunable excitation beam to each of a plurality of outputs;
   a plurality of optical fibers, in optical communication with the plurality of outputs, to transmit the tunable excitation beam simultaneously to each of a plurality of measurement sites;
   at each of the plurality of measurement sites,
   an optical probe, in optical communication with a corresponding optical fiber in the plurality of optical fibers, to illuminate the corresponding measurement site with a corresponding portion of the tunable excitation beam and to collect the Raman signal emitted from the corresponding measurement site in response to the corresponding portion of the tunable excitation beam; and
   a spectrally selective detector, in optical communication with the optical probe, to sense the Raman signal from the corresponding measurement site; and a processor, operably coupled to the optical probes, to trigger different actions along the continuous flow manufacturing line in response to peaks in the Raman signals.

2. The system of claim 1, wherein at least one of the optical probes is configured to measure a Stokes-shifted Raman signal.

3. The system of claim 2, wherein the at least one of the optical probes comprises:
a collimating lens, in optical communication with the tunable laser, to collimate the corresponding portion of the tunable excitation beam;
a first filter, in optical communication with the collimating lens, to reject amplified spontaneous emission noise emitted by the tunable laser;
a mirror, in optical communication with the first filter, to change a direction of propagation of the corresponding portion of the tunable excitation beam;
a beam splitter, in optical communication with the mirror, to separate the corresponding portion of the tunable excitation beam and the Stokes-shifted Raman signal;
a first focusing lens, in optical communication with the beam splitter, to focus the corresponding portion of the tunable excitation beam onto a sample at the corresponding measurement site and to collect the Stokes-shifted Raman signal from the sample;
a second filter, in optical communication with the beam splitter, to reject the corresponding portion of the tunable excitation beam and to pass the Stokes-shifted Raman signal; and
a second focusing lens, in optical communication with the second filter, to focus the Stokes-shifted Raman signal into an optical channel coupled to the spectrally selective detector.

4. The system of claim 1, wherein at least one of the optical probes is configured to measure an anti-Stokes shifted Raman signal.

5. The system of claim 4, wherein the at least one of the optical probes comprises:
a collimating lens, in optical communication with the tunable laser, to collimate the corresponding portion of the tunable excitation beam;
a first filter, in optical communication with the collimating lens, to reject amplified spontaneous emission noise emitted by the tunable laser;
a mirror, in optical communication with the first filter, to change a direction of propagation of the corresponding portion of the tunable excitation beam;
a beam splitter, in optical communication with the mirror, to separate the corresponding portion of the tunable excitation beam from the anti-Stokes shifted Raman signal;
a first focusing lens, in optical communication with the beam splitter, to focus the corresponding portion of the tunable excitation beam onto a sample at the corresponding measurement site and to collect the anti-Stokes shifted Raman signal from the sample;
a second filter, in optical communication with the beam splitter, to reject the corresponding portion of the tunable excitation beam and to pass the anti-Stokes shifted Raman signal; and
a second focusing lens, in optical communication with the second filter, to couple the anti-Stokes shifted Raman signal to the spectrally selective detector.

6. The system of claim 1, additionally comprising an intensity modulator to modulate an intensity of the tunable excitation beam.

7. The system of claim 1, wherein the tunable laser is a first tunable laser, the tunable excitation beam is a first tunable excitation beam, and additionally comprising a second tunable laser emitting a second tunable excitation beam.

8. The system of claim 7, wherein the first tunable excitation beam and the second tunable excitation beam are wavelength-division multiplexed.

9. The system of claim 1, wherein the plurality of measurement sites comprises sites within a continuous pharmaceutical manufacturing system.

10. The system of claim 1, wherein the plurality of measurement sites comprises sites with at least one of a greenhouse, a hydroponic facility, a clinic, or a hospital.

11. The system of claim 1, wherein the Raman signals are used for monitoring at least one of air quality, water quality, raw material, or waste material.

12. A system for monitoring a continuous flow manufacturing line, the system comprising:
a Raman pump source configured to emit a Raman pump beam;
a fiber-optic network configured to guide the Raman pump beam from the Raman pump source to each of a plurality of probes, each probe in the plurality of probes configured to probe a sample at a corresponding measurement site along the continuous flow manufacturing line with the Raman pump beam;
a plurality of detectors, each detector in the plurality of detectors configured to detect a Raman signal in response to the Raman pump beam from a corresponding measurement site along the continuous flow manufacturing line; and
a processor, operably coupled to the plurality of detectors, to monitor the Raman signals for peaks at particular wavelengths and to trigger different actions along the continuous flow manufacturing line.

13. The system of claim 12, wherein the Raman pump source is configured to emit the Raman pump beam at a power level of at least 50 mW.

14. The system of claim 12, wherein the Raman pump source is configured to tune a wavelength of the Raman pump beam as a function of time and the fiber-optic network comprises a fiber-optic switch to switch the Raman pump beam between different measurement sites along the continuous flow manufacturing line as a function of time.

15. The system of claim 12, wherein the fiber-optic network comprises a fiber-optic splitter to couple the Raman pump beam to different measurement sites along the continuous flow manufacturing line.

16. The system of claim 12, wherein each detector in the plurality of detectors comprises a filter to pass the Raman signal and to reject light at other wavelengths and a photodetector, in optical communication with the filter, to sense the Raman signal.

17. The system of claim 12, further comprising:
at least one collection fiber to guide the Raman signal from the corresponding measurement site to the corresponding detector in the plurality of detectors.

18. The system of claim 12, further comprising:
at least one modulator, in optical communication with the Raman pump source and the fiber-optic network, to modulate the Raman pump with different waveforms, each of the different waveforms corresponding to a different one of the corresponding measurement sites.

19. The system of claim 12, wherein at least one of the probes in the plurality of probes comprises:
- an excitation fiber configured to guide the Raman pump beam to the corresponding measurement site;
- collection fibers arranged concentrically around the excitation fiber and configured to collect the Raman signal from the corresponding measurement site;
- a band edge filter in optical communication with the excitation fiber and configured to pass the Raman pump beam and to reject light at other wavelengths; and
- an annular laser reject filter disposed about a circumference of the band edge filter in optical communication with the collection fibers and configured to reject the Raman pump beam and to pass the Raman signals.

20. The system of claim 1, wherein the system is a swept-source Raman system.

* * * * *